Nov. 7, 1972  R. HOOKER III  3,702,275
FIBER OPTICS ENCODING-DECODING APPARATUS AND
METHOD OF FABRICATING THE SAME

Filed June 3, 1970  2 Sheets-Sheet 1

RICHARD HOOKER, III
INVENTOR.

BY *John D. Hussey*
*Robert W. Hampton*
ATTORNEYS

RICHARD HOOKER, III
INVENTOR.

ATTORNEYS

United States Patent Office 3,702,275
Patented Nov. 7, 1972

3,702,275
FIBER OPTICS ENCODING-DECODING APPARATUS AND METHOD OF FABRICATING THE SAME
Richard Hooker III, Rochester, N.Y., assignor to
Eastman Kodak Company, Rochester, N.Y.
Filed June 3, 1970, Ser. No. 43,058
Int. Cl. B65h 81/00; G02b 5/14
U.S. Cl. 156—174                                   5 Claims

ABSTRACT OF THE DISCLOSURE

A matched pair of fiber optics image encoding-decoding bundles is fabricated by the steps of coiling a continuous optical fiber into a toroidal or similar shaped bundle of fiber convolutions; securing together a first section of each fiber convolution to form a first portion of the bundle, the remainder of each fiber convolution comprising a second section thereof; scrambling at least one second section of the fiber convolutions; securing together the second section of each fiber convolution so as to form a second portion of the bundle; and transversely cutting each fiber convolution at the first and second portions to effect two bundles with opposed end faces thereof defined by respective ones of the fiber endings. Although the opposite end faces of each bundle are arranged in different geometrical patterns of fiber endings, the corresponding end faces of the pair of bundles are arranged in substantially identical geometrical patterns of fiber endings.

BACKGROUND OF THE INVENTION

Field of the invention

The present invention relates to fiber optics image encoding-decoding and, more particularly, to a new and improved method of fabricating a fiber optics apparatus for encoding and decoding optical images and to such apparatus made in accordance with the same method.

Description of the prior art

It has heretofore been proposed to construct a fiber optics image encoding-decoding apparatus that comprises a plurality of light-transmitting fibers. Generally, such fibers are arranged in bundled relation extending from end to end of the encoding-decoding apparatus, and the opposed fiber endings are randomly or predeterminately grouped in different geometrical patterns that respectively define a face at each end of the apparatus. The bundled fibers are adapted to receive and transmit light, in accordance with well-known principles of internal reflection, from respective portions of an optical image projected onto one end face of the apparatus so as to reproduce the image portions in a random, scrambled or encoded relation upon the other end face of the apparatus. As will be readily understood, such a light-transmitting apparatus can be used in a converse manner for receiving and transmitting light from respective portions of an optical image which has been encoded by the apparatus, thereby to reproduce the scrambled image portions in reoriented or decoded relation for reading of the optical image in its original form.

A single fiber optics image encoding-decoding apparatus of the kind described above can be inexpensively manufactured and will function quite satisfactorily both for encoding optical images and for decoding those images which have been encoded by the apparatus. Similarly, a matched pair of such apparatus can be manufactured for interchangeable use thereof, each member of the pair being adapted to encode an optical image in a form which can be decoded by use of either one of the members. However, in the example of a matched pair of fiber optics image encoding-decoding bundles difficulty exists with respect to inexpensively fabricating, and yet accurately matching, each bundle. Presently known methods of fabricating accurately matched pairs of fiber optics bundles for optical image encoding-decoding do not permit their economical manufacture in large quantities.

SUMMARY OF THE INVENTION

Accordingly, it is an object of the present invention to provide a new and improved method of fabricating fiber optics image encoding-decoding apparatus.

Another object of the present invention is to provide a method of fabricating an accurately matched pair of fiber optics bundles for encoding and decoding optical images.

Still another object of the present invention is to provide a fabricating method for fiber optics image encoding-decoding apparatus that requires a minimum amount of expense, labor and assembly, while resulting in an accurately matched pair of fiber optics bundles.

Yet another object of the present invention is to provide a new and improved fiber optics image encoding-decoding apparatus.

Briefly described, there is provided by the present invention a matched pair of fiber optics bundles for encoding and decoding optical images. Each bundle comprises an equal number of light-conducting optical fibers which respectively have a fiber core of light-transmitting material of relatively high index of refraction and a fiber coating of light-insulating material of relatively low index of refraction, whereby the fibers can transmit light between opposite ends thereof by the internal reflection of the light through the fiber cores. The fibers making up each one of the pair of bundles respectively extend from end to end of a bundle in a manner defining opposed end faces thereof. Individual ones of the fibers are differently oriented relative to each other at opposite ends of a bundle. Although the opposed end faces of each bundle are arranged in different geometrical patterns of fiber endings, the corresponding end faces of the pair of bundles are arranged in substantially identical geometrical patterns of fiber endings. Accordingly, the pair of fiber optics bundles composes a matched set thereof.

In accordance with a preferred embodiment of the present invention, a method of fabricating the matched pair of fiber optics bundles for encoding and decoding optical images includes the steps of (1) helically winding a continuous optical fiber of the kind described above around a mandrel or other support so as to form a bundle of several layers of side-by-side or otherwise extending fiber convolutions; (2) securing together a first section of each fiber convolution so as to form a first portion of the layered bundle, the remainder of each fiber convolution comprising a second section thereof; (3) scrambling at least one second section of the fiber convolutions; (4) securing together the second section of each fiber convolution so as to form a second portion of the layered bundle that all but includes the first portion thereof; and (5) transversely cutting each fiber convolution respectively at the first and second portions in a manner effecting two fiber optics bundles whose corresponding end faces are arranged in substantially identical geometrical patterns of fiber endings and whose individual end faces are arranged in different geometrical patterns of fiber endings. The end faces of each bundle are then polished so that the respective fiber endings defining such faces are optically finished for facilitating the reception of light therein.

BRIEF DESCRIPTION OF THE DRAWING

The above-mentioned and other features and objects of the present invention and the manner of obtaining them will become more apparent by reference to the following detailed description of the preferred embodiment of the present invention taken in conjunction with the accompanying drawings, wherein.

DESCRIPTION OF THE PREFERRED EMBODIMENT

Figure 3:
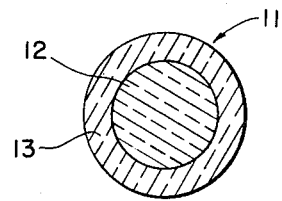
FIG. 3 is a cross-sectional view taken along the line 3—3 of FIG. 2.

With respect to the method of fabricating a fiber optics image encoding-decoding apparatus 10 of the kind shown in FIG. 1, there is provided a continuous light-conducting optical fiber 11 which as will be described more fully hereinafter is first coiled into a toroid or similar shaped figure. Preferably, as is shown in FIG. 3, the optical fiber comprises a fiber core 12 of a light-transmitting material, such as flint glass for example, having a relatively high index of refraction and a fiber coating 13 of a light-insulating material, such as crown glass for example, having a relatively low index of refraction, whereby the fiber 11 is adapted to transmit light from end to end thereof by internal reflection of the light through the fiber core 12 in accordane with well-known principles. However, it should be understood that materials other than the noted flint glass and crown glass can be used to provide fibers which are adapted to transmit light. Moreover, if desired, the fibers can be adapted in any conventional manner to transmit forms of electromagnetic energy other than light, within the scope of the invention. For example, the fiber core 12 could be made of metal or other electrically conductive material and could be provided with electrically insulating coatings of a material such as glass.

Figure 2:
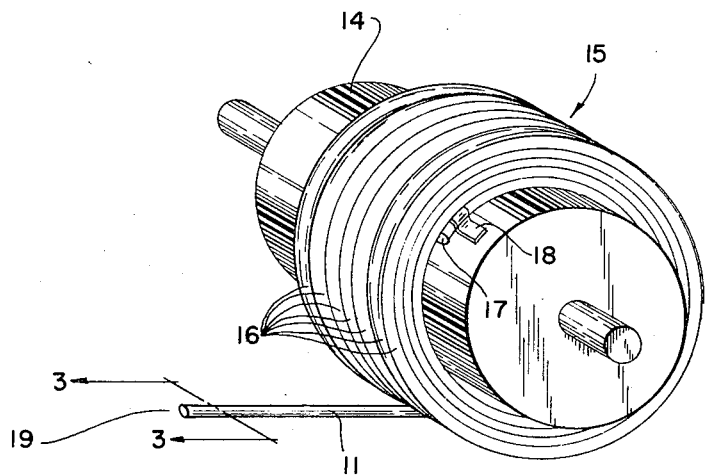
FIG. 2 is a diagrammatic view illustrating the first or winding step of a method provided by the present invention for fabricating the apparatus depicted in FIG. 1.

Referring now in particular to FIG. 2, the optical fiber 11 in accordance with the method of the present invention can be helically wound upon a support, such as mandrel 14 for example, for forming a toroidal-shaped bundle 15 of several layers of side-by-side, preferably parallel, extending fiber convolutions 16. Each of the fiber convolution layers is constructed successively by coiling the fiber 11 around the mandrel 14 in a back and forth motion, as is apparent from FIG. 2. Prior to initiation of the fiber winding step, the leading end 17 of the fiber is preferably attached to the mandrel as by tape strip 18; and after such winding has been completed, the trailing end 19 of the fiber is preferably attached to the mandrel as by tape strip 20, see FIG. 4.

Figure 4:
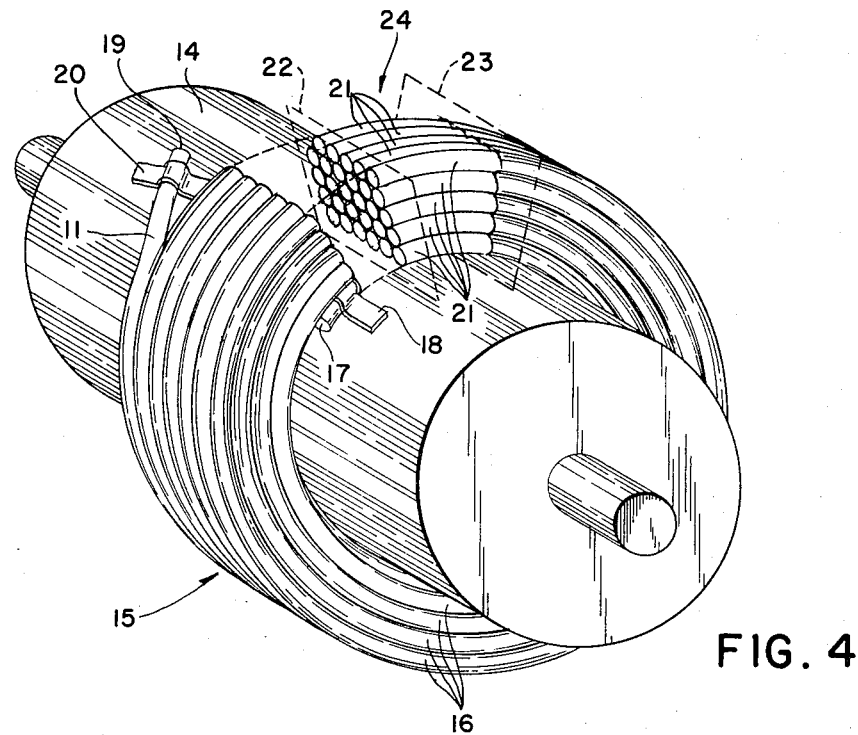
FIG. 4 is a diagrammatic view showing the second or securing step in the method of the present invention.

Then, first sections 21 of the fiber convolutions 16, which as shown in FIG. 4, respectively extend lengthwise between a pair of spaced planes 22 and 23 in a manner defining a first portion 24 of the fiber bundle 15, are respectively secured together in their existing side-by-side relation. For the purpose of illustration, the fiber bundle portion 24 is shown in FGI. 4 to be contained by the planes 22 and 23, whereby a frustum is formed. While it is not considered necessary that the first portion 24 be limited to a frustum, i.e. be contained by a pair of spaced planes; it is suggested that all those fiber convolution sections 21 respectively extending side-by-side intermediate the outer and inner diameters of the bundle 15 be included in the first portion 24 thereof. Most advantageously, the fiber convolution sections 21 in the first portion 24 are encapsulated and secured together with a suitable adhesive (not shown), such as epoxy resin, cellulose acetate or polyvinyl alcohol dope for example, for forming what can be called a shape-retaining coherent fiber bundle portion.

Figure 5:
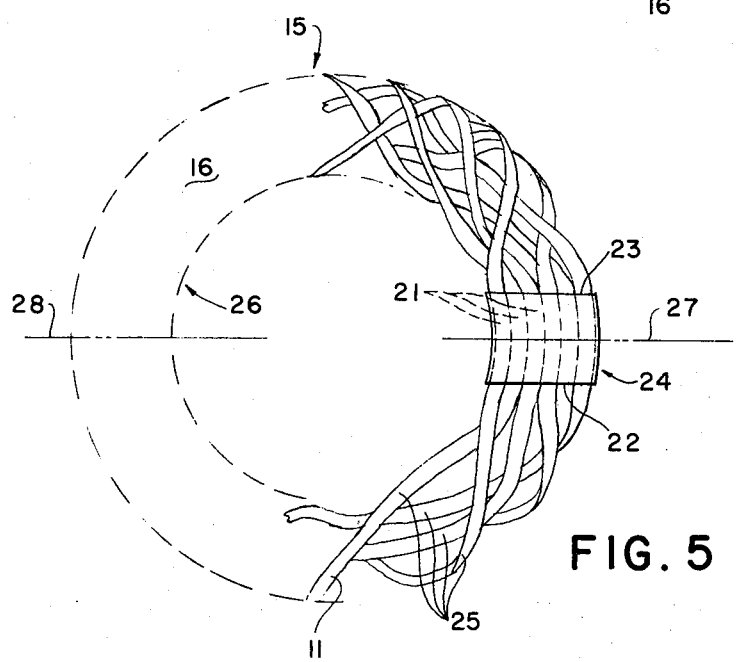
FIG. 5 is a diagrammatic view showing the third or scrambling, fourth or securing, and fifth or cutting steps in the method of the present invention.

Then, the tape strips 18 and 20 are respectively separated from the fiber ends 17 and 19 and the mandrel 14, and the mandrel is manually or otherwise separated from the fiber bundle 15. Second sections 25 of the fiber convolutions 16, which as shown in FIG. 5, respectively extend in a clockwise direction from the spaced planes 22 to 23 so as to embody a second portion 26 of the fiber bundle 15, are then scrambled in a well-known manner with respect to each other in random or predetermined fashion. Preferably, after completion of the scrambling step, at least some of the second sections 25 are no longer arranged in side-by-side extending relation but instead are arranged lengthwise in transversely extending relation.

The fiber convolution sections 25 are then respectively secured together, with the same type of adhesive (not shown) used to secure the fiber convolution sections 21. Then, the helically wound fiber 11 is cut transversely of the fiber convolutions 16, for example by cutting each convolution with shears of a diamond cutter, along lines 27 and 28 respectively at the first and second bundle portions 24 and 26, in a manner effecting a matched pair of shape-retaining coherent fiber optics bundles 30 and 31, as shown in FIG. 1. The planar end faces 33, 34 and 35, 36 respectively of the bundles 30 and 31 are then polished so that respective fiber endings 37 defining such faces are optically finished for facilitating the reception of light in the light-conducting fibers 32.

Figure 1:
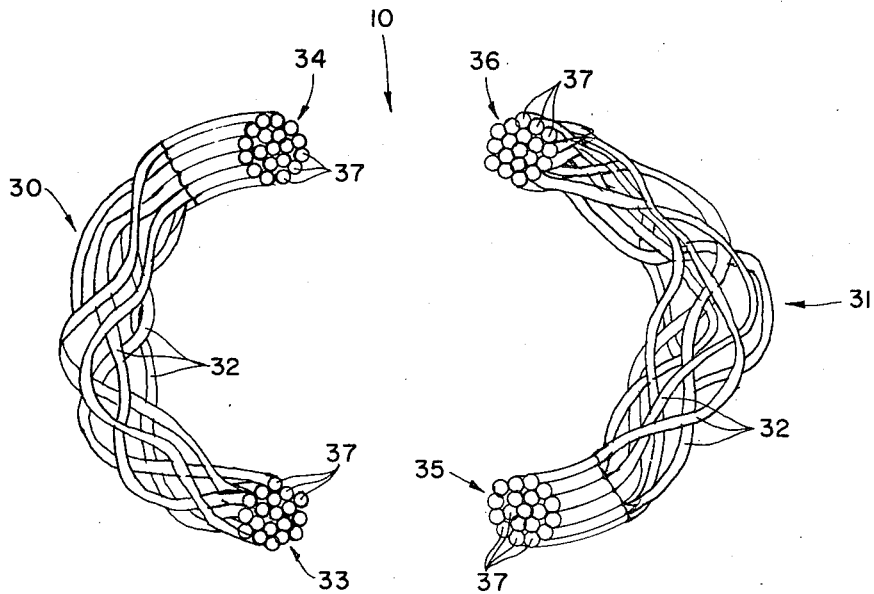
FIG. 1 is a perspective view of a matched pair of fiber optics bundles for encoding and decoding optical images in accordance with a preferred embodiment of apparatus provided by the present invention.

For convenience of illustration, only a few optical fibers 32 are shown in FIG. 1 to be embodied in each of the matched pair of bundles 30 and 31, but it will be understood that any desired size and number of fibers can be utilized for manufacturing such a pair of fiber bundles. Moreover, although the optical fiber 11 is wound on the mandrel 14 as in FIG. 2 so that the fiber convolutions 16 respectively extend in side-by-side relation, it is to be appreciated that such relation is not necessary. That is to say, the fiber convolutions can be arranged on the mandrel in transversally extending relation for example.

The lengths of the individual optical fibers 32 comprising the matched pair of bundles 30 and 31 of the optical image encoding-decoding apparatus 10 respectively extend from end to end of each bundle, partially in side-by-side relation as at 21, and partially in scrambled transversing relation as at 25, as shown in FIG. 1. With reference to FIG. 1, it can be seen that individual ones of the fibers 32 are differently oriented relative to each other at the opposite end faces 33 and 34 of the bundle 30 and at the opposite end faces 35 and 36 of the bundle 31. However, although the opposite end faces of each bundle are respectively arranged in different geometrical patterns of the fiber endings 37, the corresponding end faces 33, 36 and 34, 35 of the pair of bundles are arranged in substantially identical geometrical patterns of the fiber endings 37. Consequently, a matched pair of fiber optics bundles is provided in accordance with the above-described method.

Preferably, the bundles 30 and 31 embodying the image encoding-decoding apparatus 10 are encased in a suitable material (not shown) for example successive coatings of a plastic material such as epoxy resin, polystyrene or the like, and the material is cured or otherwise treated in conventional manner for making the material shape-retaining, thereby to support and protect the surfaces and edges of each bundle. If desired, the toroidal-shaped fiber bundle 15 can be encased in the suitable material prior to the cutting step, but after the scrambling step, whereby the suitable material will facilitate cutting of the fiber bundle 15 to provide smooth planar end faces 33–36.

It should be understood that while the toroidal shape of the fiber bundle 15 is preferred, it is obviously not necessary, and otherwise-shaped continuous fiber bundles constructed in an appropriate manner are within the scope of the present invention. Moreover, if a continuous fiber bundle, such as that referenced by 15 for example, is sufficiently large, additional first and second portions 24 and 26 can be formed thereon, whereby several respectively matched pairs of fiber optics bundles for image encoding-decoding can be constructed from a single continuous fiber bundle.

Considering now one mode of operation of the fiber optics encoding-decoding apparatus 10 shown in FIG. 1, if light is applied so as to project an optical image onto those fiber endings 37 which respectively define the end faces 33 of the bundle 30, then the fibers 32 comprising that bundle will cooperate to receive the projected image. The received image will be divided into image segments by the plurality of fibers making up the bundle 30 and these fibers will act to respectively transmit the image segments to the end face 34, whereupon the image will be reproduced or displayed. However, as the fibers of the bundle 30 are differently oriented relative to each other at the opposite end faces 33 and 34, the image segments displayed at the end face 34 will be in a configuration which is different than the original image. That is to say, the displayed image segments will be in scrambled or encoded mosaic form.

In order to decode the image segments reproduced at the end face 34 of the bundle 30, such coded image segments may be projected onto the end face 36 of the bundle 31, whereupon the image segments will be transmitted and reproduced in their original or reoriented form at the end face 35.

The present invention has been described in detail with particular reference to a preferred embodiment thereof, but it will be understood that variations and modifications can be effected within the scope of the invention.

Having described the present invention, I claim:

1. A method of fabricating from a light-conducting optical fiber, a matched pair of fiber optics bundles for encoding and decoding optical images, which comprises:
   coiling the light-conducting optical fiber so as to form a bundle of fiber convolutions;
   securing together a first section of each fiber convolution to form a first portion of the bundle, the remainder of each fiber convolution comprising a second section thereof;
   scrambling at least one second section of the fiber convolutions;
   securing together the second section of each fiber convolution to form a second portion of the bundle; and
   transversely cutting each fiber convolution respectively at the first and second portions of the bundle to effect two fiber optics bundles with opposed end faces thereof defined by respective ones of the fiber endings.

2. A method of fabricating from a light-conducting optical fiber, a matched pair of fiber optics bundles for encoding and decoding optical images, which comprises the steps of:
   winding the light-conducting optical fiber around a support so as to form a bundle of fiber convolutions;
   securing together a first section of each fiber convolution to form a first portion of the bundle, the remainder of each fiber convolution comprising a second section thereof;
   scrambling at least one second section of the fiber convolutions;
   securing together the second section of each fiber convolution to form a second portion of the bundle; and
   transversely cutting each fiber convolution respectively at the first and second portions of the bundle to effect two fiber optics bundles with opposite end faces thereof defined by respective ones of the fiber endings.

3. A method of fabricating a matched pair of fiber optics bundles as recited in claim 2, wherein:
   the support is a mandrel; and
   the light-conducting optical fiber is helically wound around the mandrel so as to form a bundle of several layers of fiber convolutions, each of the layers comprising a plurality of side-by-side extending fiber convolutions.

4. A method of fabricating a matched pair of fiber optics bundles for encoding and decoding optical images as recited in claim 3, wherein:
   at least one of the second sections of the fiber convolutions is scrambled with respect to another of the second sections of the fiber convolutions so as to extend lengthwise in transversal relation to the latter such section.

5. A method of fabricating a matched pair of fiber optics bundles for encoding and decoding optical images as recited in claim 4 wherein:
   the first sections of the fiber convolutions are secured together in side-by-side extending relation; and
   the second sections of the fiber convolutions are secured together so that at least one of such second sections is fixed lengthwise in transversal relation to another of such second sections.

References Cited
UNITED STATES PATENTS

| | | | |
|---|---|---|---|
| 3,227,535 | 1/1966 | Woodcock | 350—96 B |
| 3,215,029 | 11/1965 | Woodcock | 156—174 X |
| 3,125,812 | 3/1964 | Simpson | 350—96 B |
| 3,255,280 | 6/1966 | Burrowes | 156—296 |
| 3,361,511 | 1/1968 | Siegmund | 350—96 B |
| 3,508,821 | 4/1970 | Ujhelyi et al., | 350—96 B |

CARL D. QUARFORTH, Primary Examiner

E. E. LEHMANN, Assistant Examiner

U.S. Cl. X.R.

156—296; 350—96 B